US012640382B2

(12) United States Patent (10) Patent No.: US 12,640,382 B2

Inoue (45) Date of Patent: May 26, 2026

(54) FUEL CELL SYSTEM

(71) Applicant: HONDA MOTOR CO., LTD., Tokyo (JP)

(72) Inventor: Kazuhide Inoue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 538 days.

(21) Appl. No.: 18/114,260

(22) Filed: Feb. 26, 2023

(65) Prior Publication Data

US 2023/0307676 A1 Sep. 28, 2023

(30) Foreign Application Priority Data

Mar. 23, 2022 (JP) ................................ 2022-047009

(51) Int. Cl.
| | |
|---|---|
| *H01M 8/04992* | (2016.01) |
| *H01M 8/04119* | (2016.01) |
| *H01M 8/0438* | (2016.01) |
| *H01M 8/04746* | (2016.01) |
| *H01M 8/04858* | (2016.01) |

(52) U.S. Cl.
CPC ... *H01M 8/04992* (2013.01); *H01M 8/04164* (2013.01); *H01M 8/0438* (2013.01); *H01M 8/04753* (2013.01); *H01M 8/04925* (2013.01)

(58) Field of Classification Search
CPC ......... H01M 8/04992; H01M 8/04164; H01M 8/0438; H01M 8/04753; H01M 8/04925; H01M 8/2475; H01M 8/04402; H01M 8/04462; H01M 8/04514; H01M 8/04761; H01M 8/04843; H01M 8/04097
See application file for complete search history.

(56) References Cited

U.S. PATENT DOCUMENTS

2004/0053091 A1* 3/2004 Yokoi ................. H01M 8/0662
429/444
2006/0029848 A1* 2/2006 Kaye ................. H01M 8/04432
429/442
2008/0213635 A1* 9/2008 Blaszczyk ......... H01M 8/04761
429/429

(Continued)

FOREIGN PATENT DOCUMENTS

CN 109950582 A 6/2019
JP 2004-111142 A 4/2004
(Continued)

OTHER PUBLICATIONS

Office Action dated Jan. 30, 2024 issued in the corresponding Japanese Patent Application No. 2022-047009 with the English machine translation thereof.
(Continued)

*Primary Examiner* — Matthew W Van Oudenaren

(74) *Attorney, Agent, or Firm* — Carrier, Shende & Associates P.C.; Joseph P. Carrier; Jeffrey T. Gedeon

(57) ABSTRACT

A fuel cell system includes a drain valve for a gas-liquid separator in a fuel off-gas flow path to discharge liquid water in the gas-liquid separator, a pressure sensor disposed at a fuel gas supply flow path or the fuel off-gas flow path to detect a gas pressure in the flow path, a power generation state acquisition unit to acquire a power generation state of a fuel cell stack, and a control device. The control device controls the opening and closing of the drain valve based on the power generation state and the gas pressure.

5 Claims, 5 Drawing Sheets

(56)     References Cited

U.S. PATENT DOCUMENTS

2009/0269627 A1 *  10/2009  Zhang ............... H01M 8/04089
                                                                429/423
2019/0198897 A1     6/2019  Okamura et al.
2021/0091396 A1     3/2021  Yohsimura et al.
2021/0257634 A1     8/2021  Inoue et al.

FOREIGN PATENT DOCUMENTS

JP        2008-177116  A      7/2008
JP        2009-289540  A     12/2009
JP        2017-182943  A     10/2017
JP        2019-114351  A      7/2019
JP        2021-048064  A      3/2021
JP        2021-131957  A      9/2021

OTHER PUBLICATIONS

Office Action and Search Report dated Mar. 16, 2026 issued in the
corresponding Chinese Patent Application No. 202310187225.1
with the English machine translation thereof.

* cited by examiner

FIG. 4

FUEL CELL SYSTEM

CROSS-REFERENCE TO RELATED APPLICATIONS

This application is based upon and claims the benefit of priority from Japanese Patent Application No. 2022-047009 filed on Mar. 23, 2022, the contents of which are incorporated herein by reference.

BACKGROUND OF THE INVENTION

Field of the Invention

The present invention relates to a fuel cell system that is capable of accurately controlling water discharge from a drain valve provided in a fuel off-gas flow field without providing a water level sensor.

Description of the Related Art

In recent years, research and development have been conducted on fuel cells (FCs) that contribute to improvement in energy efficiency in order to ensure that more people have access to affordable, reliable, sustainable and modern energy.

For example, in JP 2021-048064 A, a gas-liquid separator is provided in a fuel off-gas flow field of a fuel cell stack. The gas-liquid separator is provided with a water level sensor for detecting a water level in the gas-liquid separator.

The control unit of the fuel cell system switches between opening and closing of the drain valve based on the detection signal of the water level sensor.

It is disclosed that this makes it possible to discharge water at an appropriate timing while suppressing discharge of fuel gas together with water from the gas-liquid separator.

JP 2019-114351 A discloses a technique for determining the opening of the drain valves by detecting a fluctuation in pressure in the gas-liquid separator without providing a water level sensor.

SUMMARY OF THE INVENTION

However, if there is fluctuation in the power generation state of the fuel cell stack, pressure fluctuation occurs in the anode path due to consumption of fuel gas by power generation, and there is a problem in that it is difficult to accurately determine a change in the water level in the gas-liquid separator.

An object of the present invention is to solve the above-described problems.

According to an aspect of the present invention, there is provided a fuel cell system including a fuel cell stack configured to generate electric power by an electrochemical reaction between a fuel gas and an oxygen-containing gas, a fuel gas supply flow path configured to supply the fuel gas to the fuel cell stack, a fuel off-gas flow path through which a fuel off-gas discharged from the fuel cell stack flows, a gas-liquid separator provided in the fuel off-gas flow path, a drain valve provided for the gas-liquid separator and configured to discharge liquid water in the gas-liquid separator, a pressure sensor provided at the fuel gas supply flow path or the fuel off-gas flow path, and configured to detect a gas pressure in the fuel gas supply flow path or the fuel off-gas flow path, a power generation state acquisition unit configured to acquire a power generation state of the fuel cell stack, and a control device, wherein the control device controls opening and closing of the drain valve based on the power generation state and the gas pressure.

According to the present invention, by controlling the opening and closing of the drain valve in consideration of the power generation state of the fuel cell stack and the gas pressure in the fuel gas flow path or the gas pressure in the fuel off-gas flow path, it is possible to accurately control the discharge of liquid water in consideration of the water level state in the gas-liquid separator without using a water level sensor. Since the discharge of the liquid water from the drain valve can be accurately controlled, the amount of the fuel off-gas discharged from the drain valve can be suppressed, thereby contributing to the improvement in energy efficiency.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is a map for calculating a water level estimation value;

DETAILED DESCRIPTION OF THE INVENTION

Embodiment

[Configuration]

Figure 1:
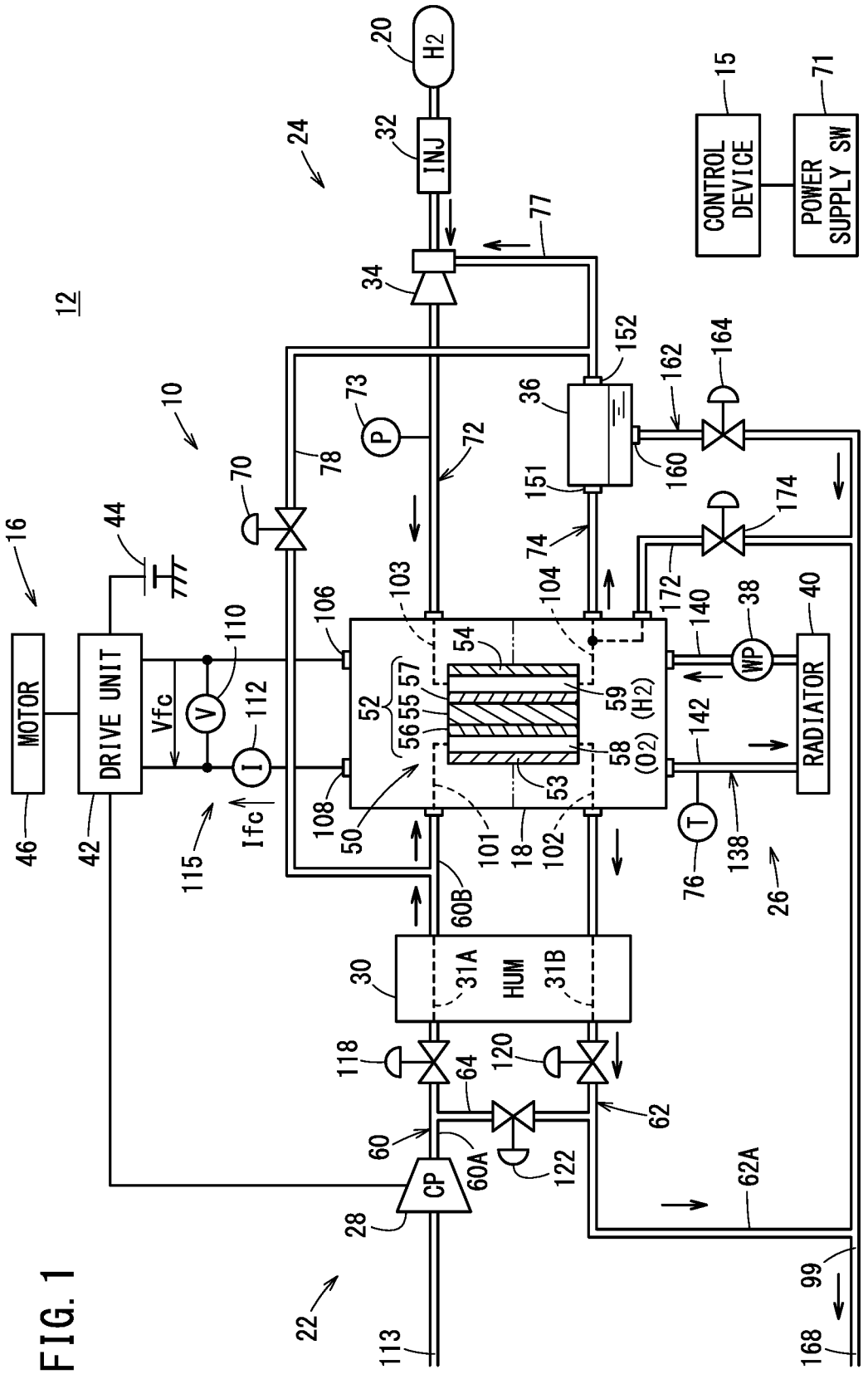
FIG. 1 is a schematic configuration diagram of a fuel cell vehicle incorporating a fuel cell system according to an embodiment of the present invention.

FIG. 1 is a schematic configuration diagram of a fuel cell vehicle 12 incorporating a fuel cell system 10 according to an embodiment of the present invention.

The fuel cell system 10 can be incorporated into other mobile bodies such as ships, aircrafts, and robots other than the fuel cell vehicle 12.

The fuel cell vehicle 12 includes a control device 15 for controlling the entire fuel cell vehicle 12, the fuel cell system 10, and an output unit 16 electrically connected to the fuel cell system 10.

For example, the control device 15 may be divided into two or more control devices such as a control device for the fuel cell system 10 and a control device for the output unit 16.

The fuel cell system 10 includes a fuel cell stack (also simply referred to as a fuel cell) 18, a hydrogen tank 20, an oxygen-containing gas supply device 22, a fuel gas supply device 24, and a coolant supply device 26.

The oxygen-containing gas supply device 22 includes a compressor (CP) 28 and a humidifier (HUM) 30.

The fuel gas supply device 24 includes an injector (INJ) 32, an ejector 34, and a gas-liquid separator 36. The injector 32 may be replaced with a pressure reducing valve. The coolant supply device 26 includes a coolant pump (WP) 38 and a radiator 40. The radiator 40 cools the circulating coolant by a traveling wind or a radiator fan (not shown) and performs heat exchange.

The output unit 16 includes a drive unit 42, a high voltage electrical power storage device (battery) 44, and a motor (electric motor) 46.

Loads of the drive unit 42 includes vehicle auxiliary devices such as the compressor 28, the coolant pump 38, and an air conditioner, in addition to the motor 46 which is a vehicle main device. The fuel cell vehicle 12 travels by the drive force generated by the motor 46.

A plurality of power generation cells 50 are stacked in the fuel cell stack 18. Each of the power generation cells 50 includes a membrane electrode assembly 52, and a pair of separators 53 and 54 that sandwich the membrane electrode assembly 52.

The membrane electrode assembly 52 includes, for example, a solid polymer electrolyte membrane 55 which is a thin film of perfluorosulfonic acid containing water, and a cathode 56 and an anode 57 which sandwich the solid polymer electrolyte membrane 55.

Each of the cathode 56 and the anode 57 has a gas diffusion layer (not shown) made from carbon paper or the like. An electrode catalyst layer (not shown) in which platinum alloy is supported on porous carbon particles is coated uniformly on the surface of the gas diffusion layer. The electrode catalyst layer is formed on both surfaces of the solid polymer electrolyte membrane 55, respectively.

On a surface of one separator 53 facing the membrane electrode assembly 52, a cathode flow field (oxygen-containing gas flow field) 58 in communication with an oxygen-containing gas inlet connection port 101 and an oxygen-containing gas outlet connection port 102 is formed.

On a surface of another separator 54 that faces the membrane electrode assembly 52, an anode flow field (a fuel gas flow field) 59 in communication with a fuel gas inlet connection port 103 and a fuel gas outlet connection port 104 is formed.

At the anode 57, when the fuel gas (hydrogen) is supplied, hydrogen ions are generated from hydrogen molecules by electrode reactions on the catalyst, and the hydrogen ions permeate through the solid polymer electrolyte membrane 55 and move to the cathode 56, while electrons are released from the hydrogen molecules.

The electrons released from the hydrogen molecules move from a negative electrode terminal 106 to the cathode 56 via a positive electrode terminal 108 through loads such as the drive unit 42 and the motor 46.

At the cathode 56, the hydrogen ions and the electrons react with oxygen contained in the supplied oxygen-containing gas by the action of the catalyst to generate water.

A voltage sensor 110 that detects generated voltage Vfc, is provided between wires that connect the positive electrode terminal 108 and the negative electrode terminal 106 to the drive unit 42. Further, a current sensor 112 that detects generated current Ifc is provided in the wire that connects the positive electrode terminal 108 and the drive unit 42.

The voltage sensor 110 and the current sensor 112 form a power generation state acquisition unit 115 that detects generated electric power as a power generation state. The power generation state acquisition unit 115 may be formed by only the current sensor 112.

The compressor 28 is configured by a mechanical supercharger or the like driven by a compressor motor (not shown) to which the stored power of the electrical power storage device 44 is supplied through the drive unit 42. The compressor 28 has a function of suctioning and pressurizing outside air (atmosphere, air) from an outside air intake port 113 and supplying the outside air to the fuel cell stack 18 through the humidifier 30.

The humidifier 30 has a flow path 31A and a flow path 31B. Air (oxygen-containing gas) that is compressed by the compressor 28, heated to a high temperature, and dried, flows through the flow path 31A. The exhaust gas discharged from the oxygen-containing gas outlet connection port 102 of the fuel cell stack 18 flows through the flow path 31B.

Here, when a bleed valve 70 described later is closed, the exhaust gas becomes wet oxygen-containing off-gas (wet oxygen-containing exhaust gas), and when the bleed valve 70 is opened, the exhaust gas becomes wet exhaust gas in which the wet oxygen-containing off-gas and the wet fuel off-gas are mixed.

The humidifier 30 has a function of humidifying the oxygen-containing gas supplied from the compressor 28. That is, the humidifier 30 makes moisture contained in the exhaust gas (off-gas) move from the flow path 31B to the supply gas (oxygen-containing gas) flowing in the flow path 31A through an inside porous membrane to humidify the supply gas, and supplies the humidified oxygen-containing gas to the fuel cell stack 18.

The compressor 28, a supply-side sealing valve 118, and the humidifier 30 are provided, in this order, in an oxygen-containing gas supply flow path 60 (including the oxygen-containing gas supply paths 60A and 60B) from the outside air intake port 113 to the oxygen-containing gas inlet connection port 101. Note that the flow paths such as the oxygen-containing gas supply flow path 60 drawn by double lines are formed by pipes (the same applies hereinafter). The supply-side sealing valve 118 opens and closes the oxygen-containing gas supply flow path 60.

An oxygen-containing off-gas flow path 62 connected to the oxygen-containing gas outlet connection port 102 is provided with the humidifier 30 and a discharge-side sealing valve 120 that also functions as a back pressure valve in this order from the oxygen-containing gas outlet connection port 102.

A bypass flow path 64 is provided between a suction port of the supply-side sealing valve 118 and an outlet port of the discharge-side sealing valve 120 to communicate the oxygen-containing gas supply flow path 60 with the oxygen-containing off-gas flow path 62. The bypass flow path 64 is provided with a bypass valve 122 that opens and closes the bypass flow path 64. The bypass valve 122 regulates the flow rate of the oxygen-containing gas bypassing the fuel cell stack 18. A merging path of the bypass flow path 64 and the oxygen-containing off-gas flow path 62 communicates with a discharge flow path 62A.

The hydrogen tank 20 is a container that includes an electromagnetically operated shut-off valve (not shown) and stores high purity hydrogen compressed at high pressure.

The fuel gas discharged from the hydrogen tank 20 is supplied to an inlet of the anode flow field 59 of the fuel cell stack 18 via the fuel gas inlet connection port 103 through the injector 32 and the ejector 34 provided in a fuel gas supply flow path 72.

In this case, the fuel gas supply flow path 72 is provided with a pressure sensor 73 that detects (measures) gas pressure Ph of the fuel gas in the fuel gas supply flow path 72.

The outlet port of the anode flow field 59 communicates with an inlet port 151 of the gas-liquid separator 36 through the fuel gas outlet connection port 104 and the fuel off-gas flow path 74, and the fuel off-gas which is a hydrogen-containing gas is supplied from the anode flow field 59 to the gas-liquid separator 36.

A lower end portion (bottom portion) of a case accommodating the fuel cell stack 18 is provided with a case lower end side discharge flow path 172 which is a case side discharge flow path communicating with the fuel gas outlet connection port 104. The case lower end side discharge flow path 172 communicates with a discharge flow path 99 through a case lower end side on-off valve 174 which is a case side on-off valve.

When the case lower end side on-off valve 174 is opened, the liquid water accumulated at the bottom portion in the case is discharged to the case lower end side discharge flow path 172. If the case lower end side on-off valve 174 is in the open state even after the discharge of the liquid water is completed, the fuel off-gas is discharged in the same manner as a drain valve 164.

Actually, part of the water generated by the power generation of the fuel cell stack 18 moves from the cathode flow field 58 to the anode flow field 59 by back-diffusion (permeation) through the membrane electrode assembly 52.

If back-diffusion water cannot be appropriately discharged from the case lower end side discharge flow path 172, the fuel off-gas flow path 74, or a circulation flow path 77, water enters the anode 57 of the fuel cell stack 18 and blocks the anode flow field (fuel gas flow field) 59. In this case, electrode deterioration due to local hydrogen starvation (fuel gas starvation) in the power generation cell 50 and deterioration in power generation stability of the fuel cell stack 18 due to inhibition of gas diffusion are caused.

In order to prevent these inconveniences, the gas-liquid separator 36 that temporarily stores water, separates the fuel off-gas into a gas component and a liquid component (liquid water).

The gaseous component of the nitrogen-containing fuel off-gas (fuel off-gas) is discharged from a gas exhaust port 152 of the gas-liquid separator 36 and supplied to the suction port of the ejector 34 through the circulation flow path 77. On the other hand, when the bleed valve 70 is opened, the nitrogen-containing fuel off-gas is also supplied to the oxygen-containing gas supply flow path 60B through a connecting flow path (communication flow path) 78 and the bleed valve 70.

The liquid component (liquid water), which is back-diffusion water, of the fuel off-gas flows from a liquid discharge port 160 of the gas-liquid separator 36 through a drain flow path 162 provided with the drain valve 164, is mixed with the exhaust gas discharged from the discharge flow path 62A, and is discharged to outside air through the discharge flow path 99 and an exhaust gas exhaust port 168.

Actually, part of the fuel off-gas (hydrogen-containing gas) is discharged to the drain flow path 162 together with the liquid water. After completion of the discharge of the liquid water, only the fuel off-gas (hydrogen-containing gas) is discharged to the drain flow path 162.

In order to dilute hydrogen gas in the fuel off-gas and discharge it to outside, part of oxygen-containing gas discharged from the compressor 28 is supplied to the discharge flow path 62A through the bypass flow path 64.

If the drain valve 164 continues to be opened even after water is drained from the drain flow path 162, hydrogen is wastefully discarded. Therefore, it is necessary to appropriately close the drain valve 164 after water is drained from the gas-liquid separator 36.

The bleed valve 70 provided in the connecting flow path 78 connecting the circulation flow path 77 of the fuel off-gas and the oxygen-containing gas supply flow path 60B is opened during running of the fuel cell vehicle 12, in order to prevent deterioration of the anode 57 due to decrease in hydrogen concentration in the anode flow field 59 caused by permeation of nitrogen in the cathode flow field 58 through the membrane electrode assembly 52.

When the bleed valve 70 is opened, the fuel off-gas discharged from the fuel cell stack 18 through the fuel off-gas flow path 74 via the gas-liquid separator 36 flows to the cathode flow field 58 via the connecting flow path 78, the oxygen-containing gas supply flow path 60B, and the oxygen-containing gas inlet connection port 101.

The fuel gas in the fuel off-gas flowing through the cathode flow field 58 is ionized into hydrogen ions by catalytic reactions at the cathode 56, and the hydrogen ions react with the oxygen-containing gas to generate water. The remaining unreacted fuel off-gas (composed of nitrogen gas and a small amount of unreacted hydrogen gas) is discharged from the fuel cell stack 18 as the oxygen-containing off-gas, and flows through the oxygen-containing off-gas flow path 62.

The oxygen-containing gas supplied through the bypass flow path 64 of the oxygen-containing gas is mixed with the oxygen-containing off-gas (including the remaining unreacted fuel off-gas) flowing through the oxygen-containing off-gas flow path 62. Then, the oxygen-containing off-gas in which the concentration of the fuel off-gas (including the fuel gas) is diluted, flows through the discharge flow path 62A.

The discharge flow path 62A communicates with the drain flow path 162 and the case lower end side discharge flow path 172, and merges into and communicates with the discharge flow path 99.

In the discharge flow path 99, the fuel gas in the mixed fluid of the liquid water and the fuel off-gas discharged from the case lower end side discharge flow path 172 and the drain flow path 162 is diluted by the oxygen-containing off-gas from the discharge flow path 62A, and is discharged to the outside (atmosphere) of the fuel cell vehicle 12 through the exhaust gas exhaust port 168.

The coolant supply device 26 of the fuel cell system 10 includes a coolant flow path 138 through which a coolant flows. The coolant flow path 138 includes a coolant supply flow path 140 and a coolant discharge flow path 142. The coolant supply flow path 140 supplies the coolant to the fuel cell stack 18, and the coolant discharge flow path 142 discharges the coolant from the fuel cell stack 18. The radiator 40 is connected to the coolant supply flow path 140 and the coolant discharge flow path 142.

The radiator 40 cools the coolant. The coolant pump 38 is provided in the coolant supply flow path 140. The coolant pump 38 circulates the coolant in a coolant circulation circuit. The coolant circulation circuit includes the coolant supply flow path 140, an internal coolant flow field of the fuel cell stack 18, the coolant discharge flow path 142, and the radiator 40. A temperature sensor 76 is provided in the coolant discharge flow path 142. Temperature (coolant outlet temperature) Ts of the coolant detected by the temperature sensor 76 is detected (measured) as the (internal) temperature of the fuel cell stack 18.

The above-described components of the fuel cell system 10 are collectively controlled by the control device 15. The supply-side sealing valve 118, the discharge-side sealing valve 120, the bleed valve 70, the drain valve 164, and the case lower end side on-off valve 174 are flow regulating valves whose opening degrees are controlled by the control device 15. However, they may be solenoid-controlled on-off valves that are operated by duty control.

The control device 15 is configured by an electronic control unit (ECU). The ECU is configured by a computer including one or more processors (CPUs), a memory, an input/output interface, and an electronic circuit. The one or more processors (CPUs) execute a program (computer-executable instructions) (not illustrated) stored in the memory.

The processor (CPU) of the control device 15 performs operation control of the fuel cell vehicle 12 and the fuel cell system 10 by executing calculation in accordance with the program.

A power switch (power supply SW) 71 of the fuel cell vehicle 12 is connected to the control device 15. The power switch 71 starts or continues (ON), and terminates (OFF) the power generation operation of the fuel cell stack 18 of the fuel cell system 10. An accelerator opening sensor, a vehicle speed sensor, and an SOC sensor of the electrical power storage device 44, which are not shown, are also connected to the control device 15.

[Operation]

The fuel cell system 10 according to the present embodiment is configured basically as described above. Hereinafter, the operation of the fuel cell system 10 will be described with reference to the flowchart of FIG. 2.

Figure 2:
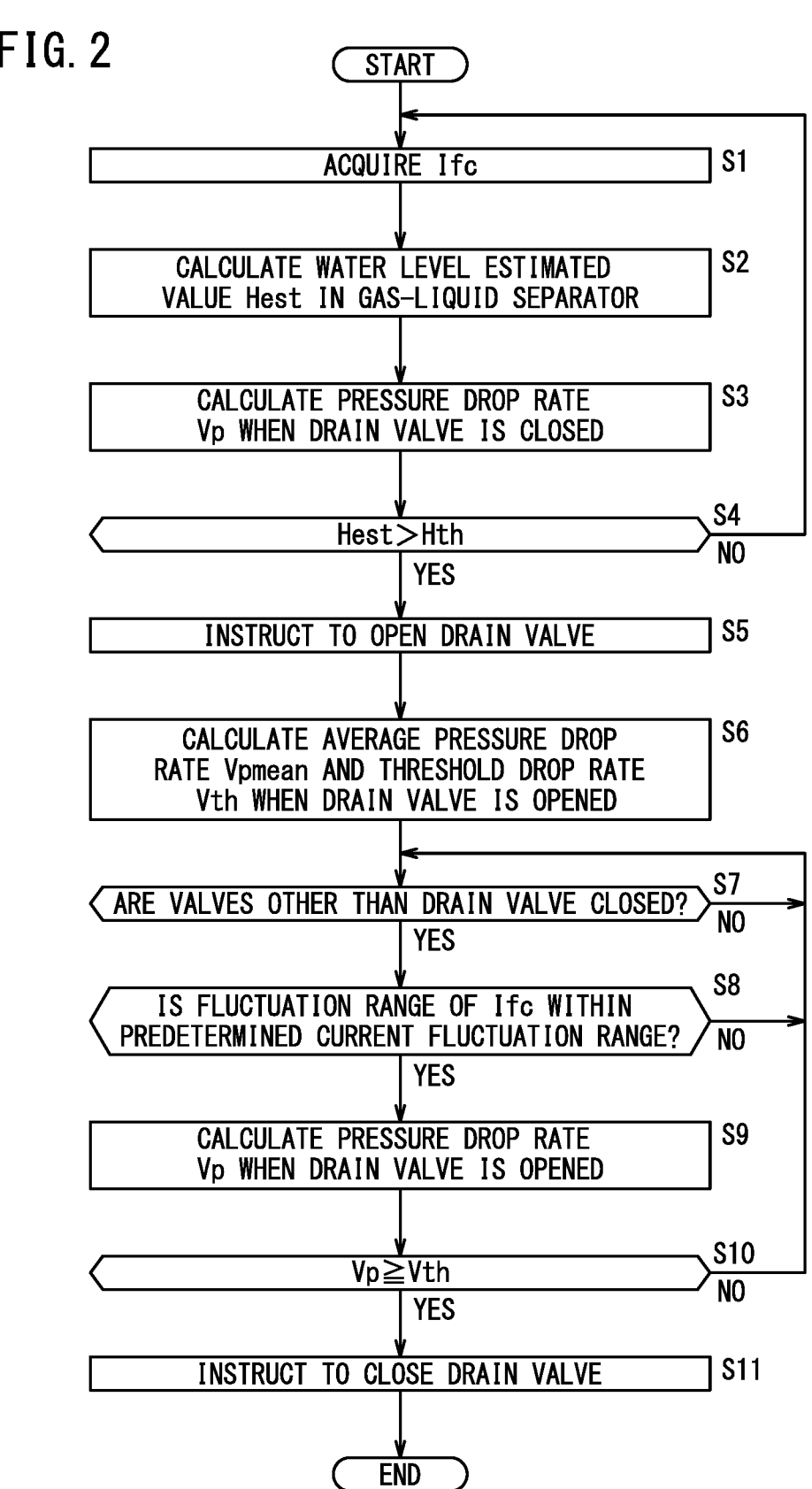
FIG. 2 is a flowchart for providing a description of operations of the fuel cell system.

The process according to the flowchart of FIG. 2 is repeatedly executed in a predetermined cycle by the control device 15 while the power switch 71 is in the ON state and the fuel cell stack 18 is generating power.

In order to facilitate understanding of the process according to the flowchart, an example of the operation will be described based on timing charts of FIGS. 3A to 3D.

Figure 3:
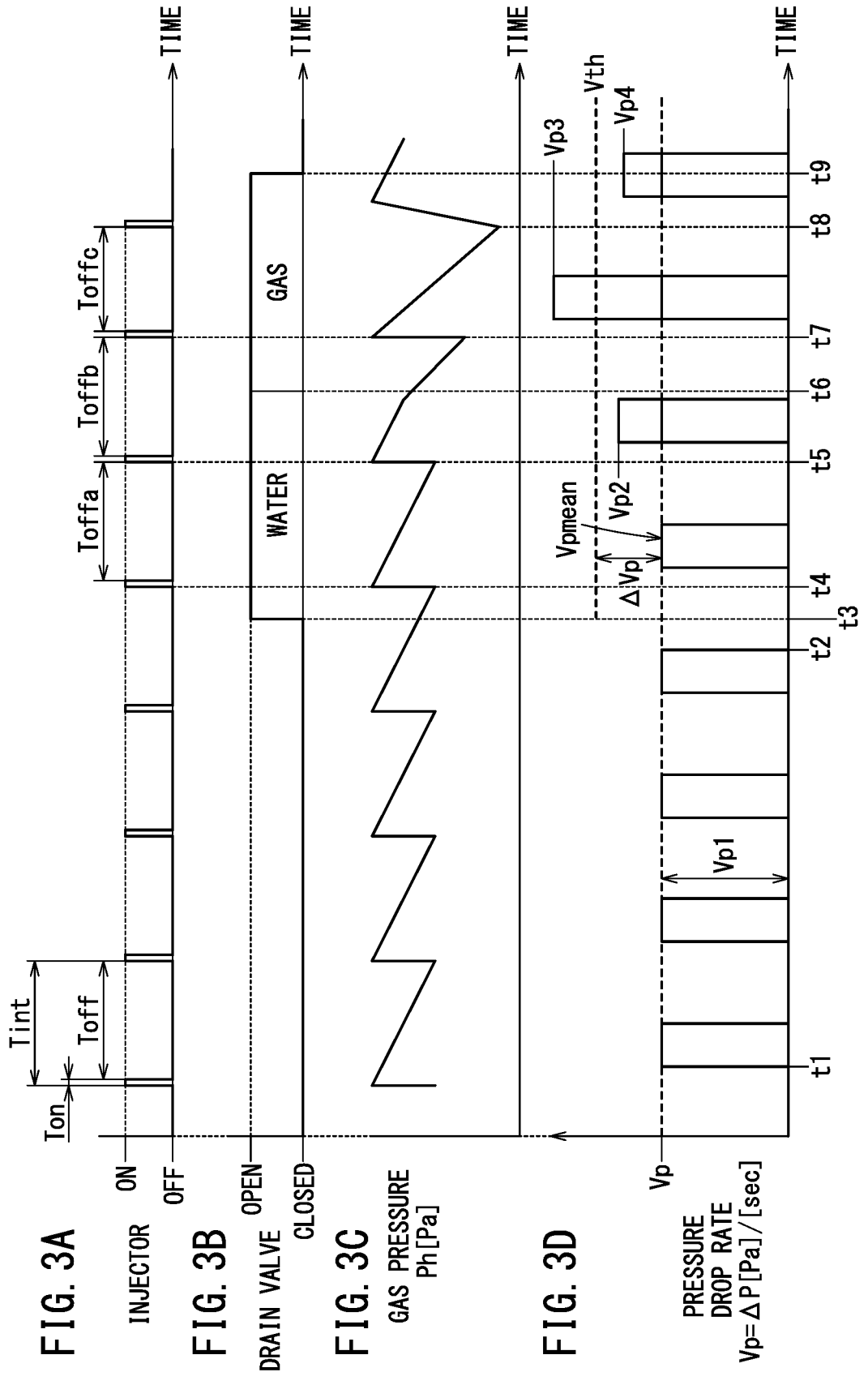
FIG. 3A is a timing chart illustrating ON/OFF periods of the injector.
FIG. 3B is a timing chart illustrating opening and closing states of the drain valve.
FIG. 3C is a timing chart illustrating fluctuation (changes over time) of gas pressure in a fuel gas supply flow field.
FIG. 3D is a timing chart illustrating changes in a pressure drop rate calculated from fluctuation (changes over time) in gas pressure.

FIG. 3A shows a state in which the injector 32 supplies (discharges) the fuel gas to the anode flow field 59 through the fuel gas inlet connection port 103 via the fuel gas supply flow path 72 during a discharge period Ton in a constant cycle (at regular intervals) Tint (Tint=Ton+Toff) under the control of the control device 15.

The discharge period Ton is an operation ON period of the injector 32. A non-discharge period Toff is an operation OFF period of the injector 32.

FIG. 3B shows the open/closed state of the drain valve 164 whose opening and closing operations are controlled by the control device 15. The drain valve 164 is in a valve open state during a period from the time point t3 to the time point t9, and is in a valve closed state during a period before the time point t3 and a period after the time point t9.

FIG. 3C shows fluctuation (changes over time) of the pressure (gas pressure) Ph [Pa] of the fuel gas in the fuel gas supply flow path 72 which is continuously detected by the pressure sensor 73 and acquired by the control device 15.

As can be seen from FIGS. 3A and 3C, the gas pressure Ph of the fuel gas increases during the discharge period Ton in which the injector 32 discharges the fuel gas to the anode flow field 59, and the gas pressure Ph of the fuel gas decreases in proportion to time during the non-discharge period Toff due to the power generation of the fuel cell stack 18.

FIG. 3D illustrates a calculated value of a pressure drop rate Vp (Vp=ΔP [Pa]/[sec]) of the gas pressure Ph in the non-discharge period Toff in which the drain valve 164 is in the valve closed state and the gas pressure Ph is proportionally reduced, and a calculated value of an average pressure drop rate Vpmean of the pressure drop rate Vp in a predetermined period (between time point t1 and time point t2 in FIG. 3D). The average pressure drop rate Vpmean is calculated by an equation: Vpmean=(ΣVp)/n (n is the number of times that the pressure drop rate Vp is acquired). The control device 15 calculates the pressure drop rate Vp and the average pressure drop rate Vpmean. The value ΔP is a drop amount (a gradient of drop) of the gas pressure Ph within a minute unit time calculated from FIG. 3C.

In the example of FIG. 3D, the drain valve 164 is opened at time point t3. The average pressure drop rate Vpmean (=(ΔP/sec)) of the pressure drop rates obtained the predetermined number of times in the non-discharge periods Toff (while the drain valve 164 is closed between time point t1 and time point t2 before time point t3) is calculated, immediately after the time point t4 (immediately after the start of a non-discharge period Toffa).

At the time of calculation of the average pressure drop rate Vpmean, the control device 15 further calculates a threshold drop rate Vth [Pa/sec] as a reference value. The threshold drop rate Vth is obtained by adding a margin (margin drop rate amount) ΔVp [Pa/sec] to the average pressure drop rate Vpmean. The margin ΔVp is a value for taking into account the dispersion of the measurement values and noise contamination.

That is, the control device 15 calculates the threshold drop rate Vth as Vth=Vpmean+ΔVp (see FIG. 3D).

As described below, the control device 15 determines time point t9 of the valve closing timing of the drain valve 164, using the threshold drop rate Vth calculated in that way. The drainage control of the liquid water stored in the gas-liquid separator 36, which is the opening/closing control of the drain valve 164 will be described below. The drainage control includes the determination of time point t3 of the opening timing of the drain valve 164.

In step S1 of FIG. 2, the control device 15 acquires generated current Ifc [A] by the current sensor 112, and advances the process to step S2.

In step S2, the control device 15 obtains a power generation amount {∫(Ifc)dt} (unit: Asec=ampere×time) which is an integrated value of the generated current Ifc, obtains an estimated value (water level estimated value) Hest of the water level of the liquid water stored in the gas-liquid separator 36, and advances the process to step S3. The power generation amount may be an electric power amount (or electric energy) [Wh] in consideration of generated voltage Vfc.

Figure 4:
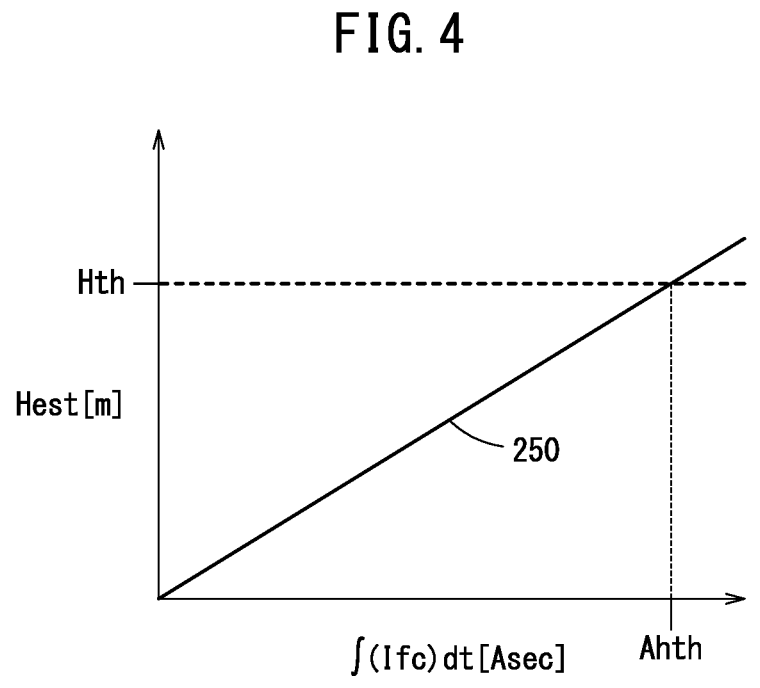

FIG. 4 illustrates an estimated water level calculation map 250 which is a map (characteristic) for calculating the water level estimated value Hest. The amount of water flows from the cathode flow field 58 to the anode flow field 59 through the membrane electrode assembly 52 by back-diffusion during power generation is proportional to the power generation amount {∫(Ifc)dt}, so that it can be uniquely calculated. Since the box structure (volume structure) of the gas-liquid separator 36 is known, by referring to the estimated water level calculation map 250 using the power generation amount {∫(Ifc)dt} as an argument, it is possible to calculate the water level estimated value Hest, which is a water level corresponding to the current power generation amount {∫(Ifc)dt}. In FIG. 4, the cross-sectional area of the water storage portion of the gas-liquid separator 36 in the horizontal direction is assumed to be constant.

Also, FIG. 4 illustrates a threshold water level Hth for determining the valve opening timing of the drain valve 164. The threshold water level Hth in the gas-liquid separator 36 is set in advance as follows. First, the lower level of the following water levels is selected: a level slightly lower than a water level at which liquid water starts to flow back from the inlet port 151 of the gas-liquid separator 36; and a level slightly lower than a water level at which liquid water starts to flow from the gas exhaust port 152 of the gas-liquid separator 36 to the circulation flow path 77. Then, the threshold water level Hth is set to a water level that is lower than the selected water level by a slight margin. The threshold water level Hth is recorded as a predetermined value (see FIG. 4) on the estimated water level calculation map 250. A power generation amount threshold corresponding to the threshold water level Hth for determining the valve opening timing is referred to as Ahth [A×sec].

In step S3, the control device 15 acquires the gas pressure Ph detected by the pressure sensor 73 when the drain valve 164 is closed, records the acquired gas pressure Ph in a storage unit, calculates the pressure drop rate Vp (Vp=ΔP [Pa]/[sec]) described with reference to FIG. 3D by using the difference from the gas pressure Ph recorded in step S3 that was performed a preset processing time period before the current step S3, records the calculated pressure drop rate Vp in the storage unit, and advances the process to step S4.

In step S4, the control device 15 determines whether or not the water level estimated value Hest calculated from the power generation amount {∫(Ifc)dt} exceeds the threshold water level Hth (power generation amount threshold Ahth). If Hest does not exceed Hth (Hest≤Hth, step S4: NO), the processing from step S1 onward is repeated, and when Hest exceeds Hth (Hest>Hth, step S4: YES), advances the process to step S5.

That is, when the power generation amount {∫(Ifc)dt} of the fuel cell stack 18 is integrated up to the power generation amount threshold Ahth and the water level estimated value Hest reaches the threshold water level Hth corresponding to the power generation amount threshold Ahth (time point t3), the control device 15 advances the process to step S5.

In step S5, the control device 15 opens the drain valve 164 so that liquid water does not flow out from the gas-liquid separator 36 to the fuel off-gas flow path 74 or circulation flow path 77. As a result, the liquid water starts to be discharged through the drain valve 164 (see the valve opening time point t3 in FIG. 3B), and the process is advanced to step S6.

At step S6 (after and near time point t4 in FIG. 3D), the control device 15 calculates the average pressure drop rate Vpmean of the gas pressures Ph at the time when the drain valve 164 is opened, adds the margin ΔP to calculate the threshold drop rate Vth [Pa/sec], and advances the process to step S7.

In step S7, the control device 15 checks whether or not all of the valves other than the drain valve 164, i.e., both of the bleed valve 70 and the case lower end side on-off valve 174 are closed, waits (step S7: NO) until they are closed (step S7: YES), and advances the process to step S8. Specifically, when the bleed valve 70 and the case lower end side on-off valve 174 are open, their opening gives influence on the gas pressure Ph obtained by the pressure sensor 73 at the fuel gas supply flow path 72.

In step S8, the control device 15 determines whether or not the fluctuation range of the generated current Ifc is within a predetermined current fluctuation range, waits (step S8: NO) until the fluctuation range of the generated current Ifc is within the predetermined current fluctuation range, and advances the process to step S9.

The reason why it is determined whether or not the fluctuation range of the generated current Ifc is within the predetermined current fluctuation range is to determine the pressure drop rate Vp in a situation in which an extreme fluctuation of the gas pressure Ph does not occur, which will be described with reference to FIGS. 5A to C as follows.

The fluctuation of the generated current Ifc during a period in which the fuel gas is not supplied from the fuel gas supply flow path 72 in the fuel cell stack 18 (the non-discharge period Toff in FIG. 3A) is directly linked to the hydrogen-ionization reaction at the anode 57, and causes fluctuation of the gas pressure Ph in the anode flow field 59 (fuel gas supply flow path 72).

Figures 5A, 5B, 5C:
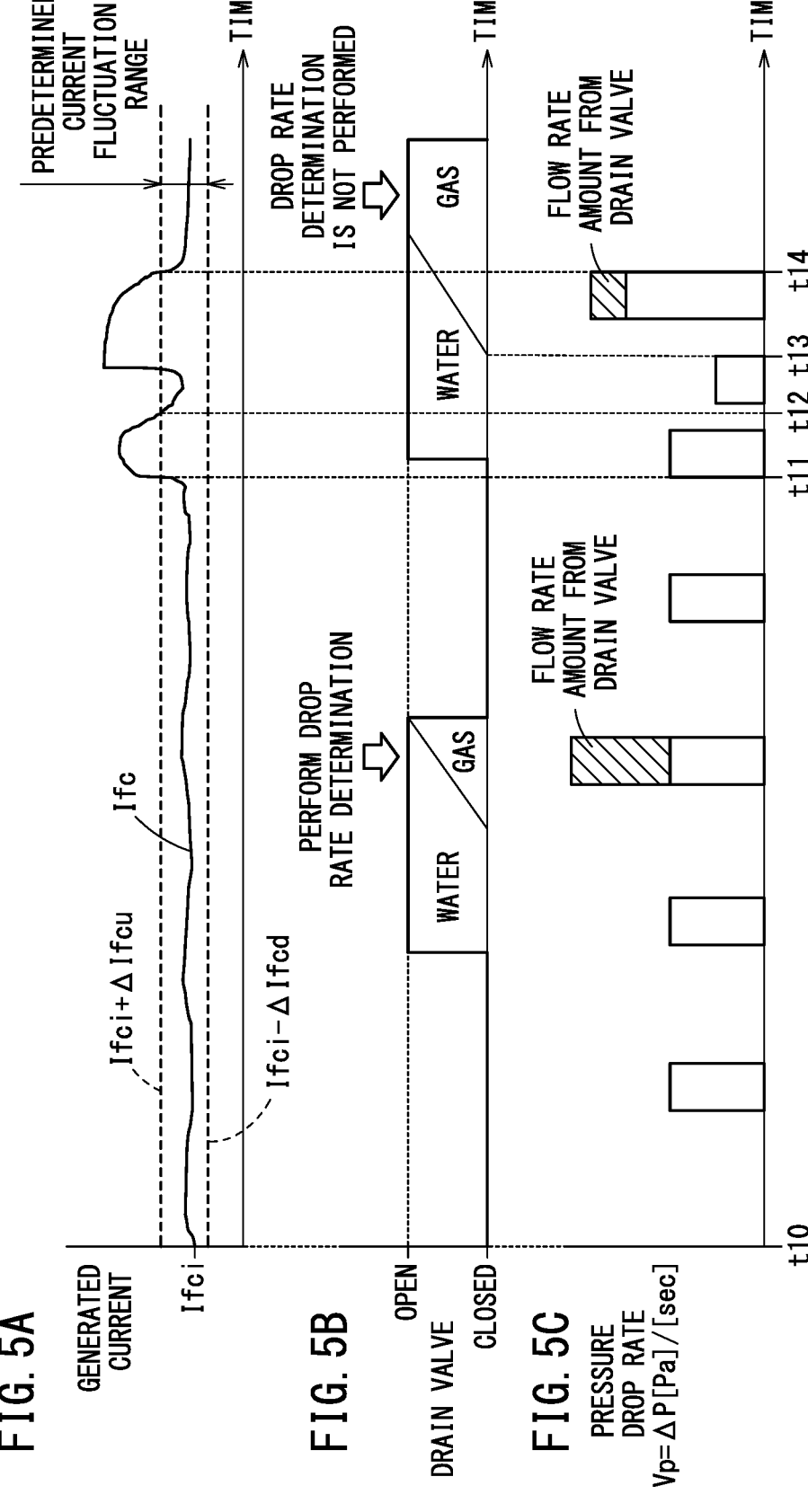
FIG. 5A is a timing chart illustrating generated current.
FIG. 5B is a timing chart illustrating the opening and closing of the drain valve, and fluid that flows in the drain valve when the drain valve is opened.
FIG. 5C is a timing chart illustrating the transition of the pressure drop rate.

FIGS. 5A to 5C are timing charts of an example for explaining the operation.

In order to proceed to the processing of step S9, as shown between time point t10 and time point t11 in FIG. 5A, it is a precondition that the generated current Ifc is a value within a predetermined current fluctuation range between an upper limit generated current (Ifci+ΔIfcu) obtained by adding an upper specified value ΔIfcu to a generated current Ifci of a certain initial value and a lower limit generated current (Ifci−ΔIfcd) obtained by subtracting a lower specified value ΔIfcd from the generated current Ifci.

As shown between time point t11 and time point t14, when the generated current Ifc exceeds the upper limit generated current (Ifci+ΔIfcu) due to, for example, a sudden change in the accelerator opening (step S8: NO), the process does not proceed to step S9 or step S10, and the drop rate determination is not performed.

When the generated current Ifc takes a value outside the predetermined current fluctuation range, there is a possibility that the reliability is lowered in detecting whether or not the change in the pressure drop rate Vp of the gas pressure Ph is caused by the opening of the drain valve 164.

When the generated current Ifc is within the predetermined current fluctuation range (step S8: YES), the control device 15 advances the process to step S9.

In step S9, the control device 15 continues opening the drain valve 164 (opened in step S5, corresponding to a period after time point t3 in FIG. 3B) and the pressure drop rate Vp in the non-discharge period Toff is calculated, and advances the process to step S10.

In step S10, the control device 15 determines whether or not the calculated pressure drop rate Vp is equal to or higher than the threshold drop rate Vth. If the evaluation is false (Vp<Vth), the process returns to the process in step S7 and if the evaluation is true (Vp≥Vth: after time point t7), the process proceeds to step S11.

The valve closing timing is described with reference to FIG. 3A to FIG. 3D. Between time point t3 and time point t5 while the drain valve 164 is opened, as shown in FIG. 3B, only liquid water is discharged to the drain valve 164, so that there is substantially no fluctuation in the gas pressures Ph. Thus, the pressure drop rate Vp does not exceed the threshold drop rate Vth.

At time point t6 in the non-discharge period Toffb, when the liquid water in the gas-liquid separator 36 flowing through the drain valve 164 decreases and the fuel off-gas is discharged to the drain valve 164, the pressure drop rate Vp increases. However, the fluctuation of the gas pressure Ph is still small, and the pressure drop rate Vp does not become equal to or higher than the threshold drop rate Vth (Vp=Vp2<Vth).

As shown from time point t7 to time point t8, when only the fuel off-gas flows through the drain valve 164, the gas pressure Ph rapidly decreases, the pressure drop rate Vp rapidly increases, and reaches the threshold drop rate Vth or more (Vp=Vp3≥Vth, step S10: YES) in the non-discharge period Toffc.

In step S11, the control device 15 determines that the discharge of the liquid water from the gas-liquid separator 36 is completed (time point t9) (pressure drop rate Vp4), and closes the drain valve 164 (instruction to close the drain valve 164).

The evaluation in step S10 may become true when the pressure drop rate Vp immediately after the drain valve 164 is opened becomes larger by a predetermined drop rate.

As described above, in the above-described embodiment, the current fluctuation monitoring function is provided for the condition of the drainage completion detection (determination of step S10) based on the pressure drop rate Vp. That is, the water discharge detection is performed only when the fluctuation range of the generated current Ifc is within the predetermined current fluctuation range (step S8: YES), so that the detection reliability is improved.

Invention that can be Obtained from Embodiment

Hereinafter, inventions that can be obtained from the above-described embodiment will be described below. Although to facilitate understanding, some of the constituent elements are designated by the reference numerals used in the above-described embodiment, the constituent elements are not limited to those elements to which such reference numerals are applied.

(1) The fuel cell system 10 according to the present invention includes the fuel cell stack 18 configured to generate electric power by the electrochemical reaction between the fuel gas and the oxygen-containing gas, the fuel gas supply flow path 72 configured to supply the fuel gas to the fuel cell stack, the fuel off-gas flow path 74 through which the fuel off-gas discharged from the fuel cell stack flows, the gas-liquid separator 36 provided in the fuel off-gas flow path, the drain valve 164 provided for the gas-liquid separator and configured to discharge liquid water in the gas-liquid separator, the pressure sensor 73 provided at the fuel gas supply flow path or the fuel off-gas flow path, and configured to detect the gas pressure Ph in the fuel gas supply flow path or the fuel off-gas flow path, the power generation state acquisition unit 115 configured to acquire the power generation state of the fuel cell stack, and the control device 15, wherein the control device controls opening and closing of the drain valve based on the power generation state and the gas pressure.

With this configuration, by controlling the opening and closing of the drain valve in consideration of the power generation state of the fuel cell stack and the gas pressure in the fuel gas flow path or the gas pressure in the fuel off-gas flow field, it is possible to accurately control the discharge of liquid water in consideration of the water level state in the gas-liquid separator without using a water level sensor. Since the discharge of the liquid water from the drain valve can be accurately controlled, the amount of the fuel off-gas discharged from the drain valve can be suppressed, thereby contributing to improvement in energy efficiency.

(2) In addition, in the fuel cell system, the control device may estimate the water level in the gas-liquid separator when the drain valve is closed based on the power generation state. When the estimated water level (water level estimated value Hest) becomes equal to or higher than the threshold water level Hth, the control device may open the drain valve to discharge the liquid water, and in the state where fluctuation in the power generation state is within the predetermined range during the opening of the drain valve, when the pressure drop rate Vp of the gas pressure detected by the pressure sensor becomes equal to or higher than the threshold drop rate Vth, the control device may close the drain valve.

According to this configuration, the water level is estimated based on the power generation state, the drain valve is opened to discharge the liquid water when the estimated water level becomes equal to or higher than the threshold water level, and during the discharge, when the pressure drop rate of the gas pressure in the fuel gas flow path or the gas pressure in the fuel off-gas flow path becomes equal to or higher than the threshold drop rate, it is possible to detect that the discharge of the off-gas is started and the discharge of water is ended.

In this way, since the drain valve can be opened and closed in consideration of the power generation state, liquid water can be accurately discharged from the drain valve without using a water level sensor. As a result, it is possible to prevent the fuel off-gas from being discharged from the drain valve due to the opening of the drain valve for a time period longer than necessary. Since power generation can be performed by the fuel gas contained in the fuel off-gas, it contributes to improvement in energy efficiency.

(3) Furthermore, the fuel cell system may further include the connecting flow path 78 connected from the fuel off-gas flow path to the oxygen-containing gas supply flow path, and the on-off valve (bleed valve 70) configured to open and close the connecting flow path to allow and prevent communication therethrough, wherein when the on-off valve is closed, the control device may control the opening and closing of the drain valve based on the power generation state and the gas pressure.

As a result, when the gas pressure fluctuates due to the opening of the on-off valve of the connecting flow path, the opening and closing control of the drain valve is not performed, so that it is possible to prevent the drain valve from being erroneously opened.

(4) Furthermore, the fuel cell system may further include a case-side on-off valve (case lower end side on-off valve 174) provided for a case accommodating the fuel cell stack and configured to discharge liquid water in the fuel cell stack to the outside, wherein when the case-side on-off valve is closed, the control device may control the opening and closing of the drain valve based on the power generation state and the gas pressure.

As a result, when the gas pressure fluctuates due to the opening of the case-side on-off valve, the opening and closing control of the drain valve is not performed, so that it is possible to prevent the drain valve from being erroneously opened.

The present invention is not limited to the above-described embodiment, and various configurations could be adopted therein without deviating from the essence and gist of the present invention.

The invention claimed is:

1. A fuel cell system comprising:
   a fuel cell stack configured to generate electric power by an electrochemical reaction between a fuel gas and an oxygen-containing gas;

an injector configured to discharge the fuel gas during a discharge period and stop the fuel gas during a non-discharge period;

a fuel gas supply flow path provided with the injector and configured to supply the fuel gas discharged from the injector to the fuel cell stack;

a fuel off-gas flow path through which a fuel off-gas discharged from the fuel cell stack flows;

a gas-liquid separator provided in the fuel off-gas flow path;

a drain valve provided for the gas-liquid separator and configured to discharge liquid water in the gas-liquid separator;

a pressure sensor provided at the fuel gas supply flow path or the fuel off-gas flow path, and configured to detect a gas pressure in the fuel gas supply flow path or the fuel off-gas flow path;

a power generation state acquisition unit configured to acquire a power generation state of the fuel cell stack; and a control device, wherein the control device includes one or more processors that execute computer-executable instructions stored in a memory, and control discharge of the fuel off-gas by opening and closing of the drain valve based on the power generation state and the gas pressure, the one or more processors execute the computer-executable instructions to cause the fuel cell system to:

estimate a water level in the gas-liquid separator based on the power generation state when the drain valve is closed;

open the drain valve to discharge the liquid water when an estimated water level becomes equal to or higher than a threshold water level; and close the drain valve in a state where fluctuation in the power generation state is within a predetermined range during the opening of the drain valve, when a pressure drop rate of the gas pressure detected by the pressure sensor becomes equal to or higher than a threshold drop rate.

2. The fuel cell system according to claim 1, wherein a water level in the gas-liquid separator when the drain valve is closed, is estimated based on the power generation state;

when an estimated water level becomes equal to or higher than a threshold water level, the drain valve is opened to discharge the liquid water; and in a state where fluctuation in the power generation state is within a predetermined range during the opening of the drain valve, when a pressure drop rate of the gas pressure detected by the pressure sensor becomes equal to or higher than a threshold drop rate, the drain valve is closed.

3. The fuel cell system according to claim 1, further comprising:

a connecting flow path connected from the fuel off-gas flow path to an oxygen-containing gas supply flow path; and an on-off valve configured to open and close the connecting flow path to allow and prevent communication therethrough, wherein when the on-off valve is closed, the fuel cell system controls the opening and closing of the drain valve based on the power generation state and the gas pressure.

4. The fuel cell system according to claim 1, further comprising a case-side on-off valve provided for a case accommodating the fuel cell stack and configured to discharge liquid water in the fuel cell stack to outside, wherein when the case-side on-off valve is closed, the fuel cell system controls the opening and closing of the drain valve based on the power generation state and the gas pressure.

5. The fuel cell system according to claim 3, further comprising a case-side on-off valve provided for a case accommodating the fuel cell stack and configured to discharge liquid water in the fuel cell stack to outside, wherein when the case-side on-off valve is closed, the fuel cell system controls the opening and closing of the drain valve based on the power generation state and the gas pressure.

* * * * *